United States Patent
Nakaji et al.

(10) Patent No.: US 10,906,137 B2
(45) Date of Patent: Feb. 2, 2021

(54) SOLDER COMPOSITION AND ELECTRONIC BOARD

(71) Applicant: TAMURA CORPORATION, Tokyo (JP)

(72) Inventors: Shoichi Nakaji, Iruma (JP); Daiki Amino, Iruma (JP); Hiro Einishi, Iruma (JP)

(73) Assignee: TAMURA CORPORATION, Tokyo (JP)

(*) Notice: Subject to any disclaimer, the term of this patent is extended or adjusted under 35 U.S.C. 154(b) by 144 days.

(21) Appl. No.: 16/021,705

(22) Filed: Jun. 28, 2018

(65) Prior Publication Data
US 2019/0015937 A1    Jan. 17, 2019

(30) Foreign Application Priority Data
Jul. 12, 2017 (JP) ................. 2017-135976

(51) Int. Cl.
| | |
|---|---|
| *B23K 35/362* | (2006.01) |
| *B23K 35/26* | (2006.01) |
| *B23K 35/02* | (2006.01) |
| *C08K 5/3432* | (2006.01) |
| *C08K 5/092* | (2006.01) |
| *C08L 93/04* | (2006.01) |
| *B23K 101/42* | (2006.01) |

(52) U.S. Cl.
CPC ........ *B23K 35/362* (2013.01); *B23K 35/0244* (2013.01); *B23K 35/262* (2013.01); *C08K 5/092* (2013.01); *C08K 5/3432* (2013.01); *C08L 93/04* (2013.01); *B23K 2101/42* (2018.08)

(58) Field of Classification Search
CPC ............................. B23K 35/262; B23K 35/362
USPC .......................................................... 148/23
See application file for complete search history.

(56) References Cited

U.S. PATENT DOCUMENTS

| | | | | |
|---|---|---|---|---|
| 2003/0221748 A1* | 12/2003 | Arzadon | ............. | B23K 35/025 148/23 |
| 2011/0080691 A1* | 4/2011 | Ning | ............. | C08L 65/00 361/525 |
| 2015/0102090 A1* | 4/2015 | Arai | ............. | B23K 35/36 228/224 |
| 2015/0217409 A1* | 8/2015 | Akagawa | ............. | B23K 35/00 174/126.2 |

FOREIGN PATENT DOCUMENTS

| | | | |
|---|---|---|---|
| JP | 2001-138089 A | 5/2001 | |
| JP | 2004-322139 A | 11/2004 | |
| JP | 2006-110580 A | 4/2006 | |
| JP | 5887330 | 2/2016 | |
| JP | 2017-064783 A | 4/2017 | |

OTHER PUBLICATIONS

Japanese Office Action with English Translation dated Apr. 23, 2019, 5 pages.

* cited by examiner

*Primary Examiner* — Weiping Zhu
(74) *Attorney, Agent, or Firm* — Rankin, Hill & Clark LLP

(57) ABSTRACT

A solder composition of the invention contains solder powders and a flux composition. The flux composition contains (A) a resin and (B) an activator. The (B) component contains (B1) an organic acid, and (B2) a pyridine compound represented by a formula (1) below. A chlorine concentration is 900 mass ppm or less, a bromine concentration is 900 mass ppm or less, an iodine concentration is 900 mass ppm or less and a total halogen concentration is 1500 mass ppm or less in the solder composition.

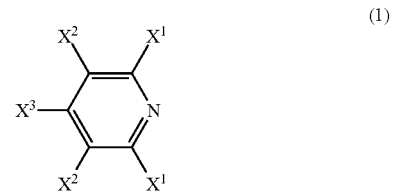

(1)

In the formula (1), $X^1$, $X^2$ and $X^3$ are the same or different, each of $X^1$, $X^2$ and $X^3$ representing a hydrogen atom, a hydroxyl group, a methyl group, an ethyl group or a propyl group, and all of $X^1$, $X^2$ and $X^3$ are not simultaneously hydrogen atoms.

22 Claims, No Drawings

SOLDER COMPOSITION AND ELECTRONIC BOARD

The entire disclosure of Japanese Patent Application No. 2017-135976 filed Jul. 12, 2017 is expressly incorporated by reference herein.

TECHNICAL FIELD

The present invention relates to a solder composition and an electronic board.

BACKGROUND ART

A solder composition is a paste mixture provided by kneading solder powders and a flux composition (a composition containing, for instance, a rosin-based resin, activator and solvent) (see Patent Literature 1: JP 5887330 B). Recently, lead-free solders containing no lead (Pb) have come to be widely used in view of environmental issues. A halogen-free flux composition, whose halogen content is reduced, and non-halogen flux composition containing no halogen have also come to be desired in view of the environmental issues.

Halogen compounds have been used in the typical flux compositions as activators with excellent performance. However, the halogen-free or non-halogen flux compositions have to use an activator other than the halogen activator to supplement the activation effect. Accordingly, it has been studied to use, for instance, an activator composition containing both of an organic acid and amines. The above activator composition can supplement the activation effect and solder-melting property can be improved. However, typical organic acid and amines easily react at a room temperature, resulting in inferior preservation stability.

SUMMARY OF THE INVENTION

An object of the invention is to provide a solder composition exhibiting sufficient solder-melting property and preservation stability, and an electronic board using the solder composition.

To solve the above problem, the present invention provides a solder composition and an electronic board described hereinbelow.

A solder composition according to an aspect of the invention contains: solder powders; and a flux composition, in which the flux composition includes (A) a resin and (B) an activator, the (B) component includes (B1) an organic acid and (B2) a pyridine compound represented by a formula (1) below, and a chlorine concentration is 900 mass ppm or less, a bromine concentration is 900 mass ppm or less, an iodine concentration is 900 mass ppm or less, and a total halogen concentration is 1500 mass ppm or less in the solder composition.

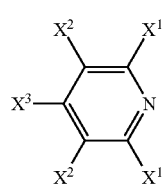

(1)

In the formula (1), $X^1$, $X^2$ and $X^3$ are the same or different, each of X1, X2 and X3 representing a hydrogen atom, a hydroxyl group, a methyl group, an ethyl group or a propyl group, and all of $X^1$, $X^2$ and $X^3$ are not simultaneously hydrogen atoms.

An electronic board according to another aspect of the invention includes a soldered portion using the solder composition according to the above aspect of the invention.

Though it is not clearly known why the flux composition of the above aspect of the invention exhibits sufficient solder-melting property and preservation stability, the inventors of the invention speculate as follows.

The solder composition of the above aspect of the invention contains the (B) activator in a form of the (B1) organic acid and the (B2) compound represented by the formula (1). Oxide film on a metal surface can be removed by the (B1) component. The (B2) component can form a film of a complex on the metal surface whose oxide film has been removed, to prevent re-oxidation of the metal surface. Accordingly, sufficient solder-melting property can be ensured without using a halogen activator. In addition, with the use of the component (B2), which is specifically selected from among amines, in combination with the (B1) component, reactivity at a room temperature becomes very poor as compared with the use of typical organic acid and amines. Accordingly, sufficient preservation stability can be ensured. The inventors speculate the advantages of the above aspect of the invention are achieved as described above.

According to the above aspects of the invention, a solder composition exhibiting sufficient solder-melting property and preservation stability, and an electronic board using the solder composition can be provided.

DESCRIPTION OF EMBODIMENT(S)

Solder compositions and electronic boards according to exemplary embodiments of the invention will be described below.

First Exemplary Embodiment

Flux Composition

Initially, a flux composition for use in the first exemplary embodiment will be described. The flux composition for use in the first exemplary embodiment is a component of the solder composition other than solder powders. The flux composition includes (A) a resin and (B) an activator.

(A) Component

Examples of the (A) resin for use in the first exemplary embodiment include (A1) a rosin-based resin and (A2) a thermosetting resin. It should be noted that, the flux composition using the (A1) rosin-based resin (so-called rosin-based flux) is not thermosetting, the flux composition using the (A2) thermosetting resin is thermosetting.

It should also be noted that the (A) resin is exemplified by the (A1) rosin-based resin in the first exemplary embodiment.

Examples of the (A1) rosin-based resin include rosins and modified rosin-based resins. Examples of the rosins include gum rosin, wood rosin, and tall oil rosin. Examples of the modified rosin-based resin include a disproportionated rosin, polymerized rosin, hydrogenated rosin (fully hydrogenated rosin, partially hydrogenated rosin, and hydrogenated product of modified unsaturated organic acid rosin (sometimes referred to as a "hydrogenated modified rosin"), which is a modified rosin of unsaturated organic acid (e.g. an aliphatic monobasic acid such as (meth)acrylic acid, an aliphatic unsaturated dibasic acid such as α,β-unsaturated carboxylic acid (e.g. fumaric acid and maleic acid), and an unsaturated carboxylic acid including an aromatic ring (e.g. cinnamic acid)) and a derivative thereof. One type of the rosin-based resins as described above may be used alone or two or more types thereof may be used in combination.

A content of the (A) component is preferably in a range from 30 mass % to 70 mass % with respect to 100 mass % of the flux composition, more preferably in a range from 35 mass % to 60 mass %. The (A) component of a content at or above the lower limit prevents oxidation of a copper foil surface of a soldering land to allow the molten solder to spread over the surface (i.e. improves so-called solderability), so that generation of solder balls can be sufficiently reduced. The (A) component of a content at or below the upper limit can sufficiently reduce an amount of flux residue.

The (B) activator for use in the first exemplary embodiment needs to contain below-described (B1) organic acid.

The (B1) organic acid for use in the first exemplary embodiment includes a hydrocarbon group and a carboxyl group. In some embodiments, the (B1) component contains a substituent (e.g. a hydroxyl group and amino group) other than the hydrocarbon group and carboxyl group. A part of carbon atoms of the hydrocarbon group of the (B1) component may be substituted with nitrogen atom(s). Though the hydrocarbon of the hydrocarbon group may be an aliphatic hydrocarbon or an aromatic hydrocarbon, in view of the activation effect, the hydrocarbon of the hydrocarbon group is preferably an aliphatic hydrocarbon. Though the hydrocarbon of the hydrocarbon group may be a saturated hydrocarbon or unsaturated hydrocarbon, in view of the activation effect, the hydrocarbon of the hydrocarbon group is preferably a saturated hydrocarbon.

Examples of the (B1) component include monocarboxylic acid, dicarboxylic acid, tricarboxylic acid and other organic acid. Among the above, the use of dicarboxylic acid and tricarboxylic acid is preferable in terms of the activation effect and preservation stability when being used in combination with below-described (B2) component. The use of dicarboxylic acid having 3 to 22 (more preferably 4 to 12, especially preferably 4 to 7) carbon atoms, and tricarboxylic acid having 3 to 22 (more preferably 4 to 12, especially preferably 6 to 9) carbon atoms is more preferable. One type of the organic acids as described above may be used alone or two or more types thereof may be used in combination.

Examples of the monocarboxylic acid include formic acid, acetic acid, propionic acid, butyric acid, valeric acid, caproic acid, enanthic acid, capric acid, lauryl acid, myristic acid, pentadecyl acid, palmitic acid, margaric acid, stearic acid, tuberculostearic acid, arachidic acid, behenic acid, and lignoceric acid.

Examples of the dicarboxylic acid include oxalic acid, malonic acid, succinic acid, glutaric acid, adipic acid, pimelic acid, suberic acid, azelaic acid, sebacic acid, dodecanedioic acid, eicosanedioic acid, fumaric acid, and maleic acid Examples of the tricarboxylic acid include propane tricarboxylic acid, hexane tricarboxylic acid, cyclohexane tricarboxylic acid, and benzene tricarboxylic acid.

Examples of the other organic acid include dimer acid, trimer acid, glycolic acid, diglycolic acid, levulinic acid, lactic acid, tartaric acid, acrylic acid, benzoic acid, salicylic acid, anisic acid, citric acid and picoline acid. A content of the (B1) component is preferably in a range from 0.1 mass % to 25 mass % with respect to 100 mass % of the flux composition, more preferably in a range from 0.5 mass % to 20 mass %. The (B1) component of a content at or above the lower limit can further enhance the soliderability. The (B1) component of a content at or below the upper limit can sufficiently reduce the amount of flux residue.

The (B) activator for use in the first exemplary embodiment needs to contain the (B2) pyridine compound represented by the formula (1) below, in addition to the (B1) organic acid.

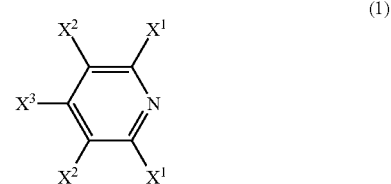

(1)

In the formula (1), $X^1$, $X^2$ and $X^3$ may be the same or different, each representing a hydrogen atom, a hydroxyl group, a methyl group, an ethyl group or a propyl group, where all of $X^1$, $X^2$ and $X^3$ are not simultaneously hydrogen atoms.

Further, it is preferable that at least one of $X^1$, $X^2$ and $X^3$ is a hydroxyl group. Further, it is preferable that at least $X^3$ is a hydroxyl group.

Examples of the (B2) component used in the first exemplary embodiment include 4-hydroxypyridine, 2,6-dihydroxypyridine, 3,5-dihydroxypyridine, 2,4,6-trihydroxypyridine, 3,4,5-trihydroxypyridine, 2,6-dimethyl-4-hydroxypyridine, 3,5-dimethyl-4-hydroxypyridine, 2,6-diethyl-4-hydroxypyridine, 3,5-diethyl-4-hydroxypyridine, 2,6-dipropyl-4-hydroxypyridine, and 3,5-dipropyl-4-hydroxypyridine. For instance, 4-hydroxypyridine is a compound represented by a structural formula (S1) below. Unlike the other amines, the (B2) component hardly deteriorates the preservation stability of the solder composition even when being used in combination with the (B1) component. The reason is not clearly known. However, for instance, 2-hydroxypyridine, which includes a pyridine ring and a hydroxyl group as in 4-hydroxypyridine, deteriorates the preservation stability of the solder composition. Thus, the inventors of the invention speculate that not only the type of the substituent of the amines but also the structure of the amines (e.g. symmetry in the structure) affects the preservation stability of the solder composition.

(S1)

A mass ratio (B1/B2) between the content of the (B1) component and the content of the (B2) component is preferably in a range from 1/9 to 9/1, more preferably in a range from 2/8 to 8/2, especially preferably in a range from 6/4 to 4/6. With the mass ratio within the above range, the synergetic effects by the (B1) component and the (B2) component can further be enhanced, thereby further improving the solder-melting property.

A content of the (B2) component is preferably in a range from 0.1 mass % to 10 mass % with respect to 100 mass % of the flux composition, more preferably in a range from 0.3 mass % to 8 mass %, further preferably in a range from 1 mass % to 5 mass %, especially preferably in a range from 2 mass % to 5 mass %. The (B2) component of the content at or above the lower limit can further enhance the solderability. Further, reliability is not impaired when the content is at or below the upper limit.

The (B) component may further contain additional activator(s) (e.g. an organic acid amine salt, halogen activator) other than the (B1) and (B2) components as long as the additional activator(s) is compatible with an object of the invention. It should be noted, however, that the (B) component preferably consists of the (B1) and (B2) components in order to provide a halogen-free composition. A sum of the contents of the (B1) and (B2) components is preferably 85 mass % or more with respect to 100 mass % of the component (B), more preferably 90 mass % or more, especially preferably 95 mass % or more.

A total content of the (B) component is preferably in a range from 1 mass % to 30 mass % with respect to 100 mass % of the flux composition, more preferably in a range from 2 mass % to 25 mass %. The (B) component of the content of at or above the above lower limit can more reliably reduce the generation of solder balls. Further, the (B) component of a content at or below the upper limit can ensure insulation reliability of the flux composition.

(C) Component

It is preferable that the flux composition of the first exemplary embodiment further contains a (C) solvent in terms of printability and the like. Known solvents can be used as the (C) solvent used herein. The above solvent preferably has a boiling point of 170 degrees C. or more.

Examples of the solvent include diethylene glycol, dipropylene glycol, triethylene glycol, hexylene glycol, hexyl diglycol, 1,5-pentanediol, methyl carbitol, butyl carbitol, 2-ethylhexyl diglycol, octanediol, phenyl glycol, diethylene glycol monohexylether, tetraethylene glycol dimethylether, and dibutyl maleic acid. One type of the solvents as described above may be used alone or two or more types thereof may be used in combination.

When used, the content of the (C) component is preferably in a range from 10 mass % to 60 mass % with respect to 100 mass % of the flux composition, more preferably in a range from 20 mass % to 40 mass %. When the content of the solvent is in the above-described range, a viscosity of the obtained solder composition can be adjusted to be within an appropriate range.

(D) Component

The flux composition of the first exemplary embodiment may further contain a (D) thixotropic agent in terms of printability and the like. Examples of the (D) thixotropic agent used herein include hardened castor oil, polyamines, polyamides, bisamides, dibenzylidene sorbitol, kaolin, colloidal silica, organic bentonite and glass frit. Among the above, polyamides are preferable in terms of reduction in shear drop by heating. One type of the thixotropic agents as described above may be used alone or two or more types thereof may be used in combination.

When the (D) component is used, the content of the (D) component is preferably in a range from 1 mass % to 15 mass % with respect to 100 mass % of the flux composition, more preferably in a range from 5 mass % to 12 mass %. The (D) component of the content at or above the lower limit can provide sufficient thixotropy and can sufficiently reduce shear drop. Further, printing failure due to excessive thixotropy can be avoided when the content is at or below the upper limit.

Other Components

The flux composition used in the first exemplary embodiment may contain other additive(s) and/or other resin(s) in addition to the above (A), (B), (C) and (D) components, as necessary. Examples of the other additive(s) include an antifoaming agent, an antioxidant, a modifier, a delustering agent, a foaming agent, and a hardening accelerator. Examples of the other resin(s) include polyimide resin.

Solder Composition

Next, the solder composition of the first exemplary embodiment will be described. The solder composition of the first exemplary embodiment contains the flux composition and below-described (E) solder powders.

A content of the flux composition is preferably in a range from 5 mass % to 40 mass % with respect to 100 mass % of the solder composition, more preferably in a range from 7 mass % to 15 mass %, especially preferably in a range from 8 mass % to 12 mass %. At a content of 5 mass % or more (i.e. with the content of the solder powders being 95 mass % or less), the amount of the flux composition is sufficient for the flux composition to serve as a binder, so that the flux composition can be easily mixed with the solder powders. Further, the solder composition whose flux composition content is 40 mass % or less (i.e. the content of the solder powders being 60 mass % or more) achieves sufficient solder joint when the resultant solder composition is used.

In the solder composition according to the first exemplary embodiment, it is required that a chlorine concentration is 900 mass ppm or less, a bromine concentration is 900 mass ppm or less, an iodine concentration is 900 mass ppm or less, and a total halogen concentration is 1500 mass ppm or less. It should be noted that examples of halogen include fluorine, chlorine, bromine, iodine and astatine.

Further, in order to address the environmental issues, the chlorine concentration, bromine concentration and iodine concentration are each preferably 500 mass ppm or less, more preferably 300 mass ppm or less, especially preferably 100 mass ppm or less. The halogen concentration is preferably 800 mass ppm or less, more preferably 500 mass ppm or less, further preferably 300 mass ppm or less, especially preferably 100 mass ppm or less. It is preferable that no halogen is contained in the flux composition except for inevitable impurities.

It should be noted that the chlorine concentration, bromine concentration, iodine concentration and halogen concentration in the solder composition can be measured according to the method described in JEITA ET-7304A. The chlorine concentration, bromine concentration, iodine concentration and halogen concentration can also be simply calculated based on the components of the solder composition and contents thereof.

(E) Component

The (E) solder powders for use in the first exemplary embodiment preferably consists solely of lead-free solder powders. However, the (E) solder powders may alternatively be leaded solder powders. The solder alloy for the solder powders is preferably an alloy whose main component is tin (Sn). Examples of a second element for the alloy include silver (Ag), copper (Cu), zinc (Zn), bismuth (Bi), indium (In) and antimony (Sb). Other element(s) (a third (and subsequent) element(s)) may be contained in the alloy, as necessary. Examples of the other element(s) include copper, silver, bismuth, indium, antimony, cobalt (Co), chrome (Cr), nickel (Ni), germanium (Ge), iron (Fe), and aluminum (Al).

The lead-free solder powders herein means powders of solder metal or alloy to which lead is not added. Though lead in a form of an inevitable impurity may be present in the lead-free solder powders, the content of the lead in the form of inevitable impurity is preferably 100 mass ppm or less.

Specific examples of the lead-free solder powders include Sn—Ag, Sn—Ag—Cu, Sn—Cu, Sn—Ag—Bi, Sn—Bi, Sn—Ag—Cu—Bi, Sn—Sb, Sn—Zn—Bi, Sn—Zn, Sn—Zn—Al, Sn—Zn—Bi—Al, Sn—Ag—Bi—In, Sn—Ag—Cu—Bi—In—Sb, and In—Ag. Among the above, Sn—Ag—Cu solder alloy is suitably usable in terms of strength in solder joint. The melting point of the Sn—Ag—Cu solder typically ranges from 200 degrees C. to 250 degrees C. The melting point of Sn—Ag—Cu solder with low silver content ranges from 210 degrees C. to 250 degrees C. Sn—Bi solder alloy is also suitably usable for the purpose of achieving low melting point. The melting point of Sn—Bi solder typically ranges from 130 degrees C. to 170 degrees C. An average particle diameter of the (E) component typically ranges from 1 μm to 40 μm, which is more preferably from 1 μm to 35 μm, further preferably 2 μm to 35 μm, especially preferably 3 μm to 32 μm in order to allow the solder composition to be applicable to electronic boards whose pitches between soldering pads are small. It should be noted that the average particle diameter can be measured with a particle-size measurement device using dynamic light scattering.

Manufacturing Method of Solder Composition

The solder composition of the first exemplary embodiment can be manufactured by mixing the above-described flux composition and above-described (E) solder powders at the above predetermined ratio, and stirring and mixing the flux composition and the solder powders.

Electronic Board

Next, the electronic board of the first exemplary embodiment will be described below. An electronic board of the first exemplary embodiment includes a soldered portion using the above-described solder composition. The electronic board (e.g. printed circuit board) can be produced by attaching electronic components on an electronic board (e.g. printed wiring board).

Examples of a coating applicator to be used include a screen printer, a metal mask printer, and a dispenser.

Further, the electronic component can be attached on the electronic board by a reflow process in which the electronic component is placed on the solder composition applied by the coating applicator and heated by a reflow furnace under a predetermined condition, so as to attach the electronic component on the printed wiring board. Examples of the reflow furnace include an air reflow machine, vacuum reflow machine, formic-acid reflow machine, and plasma reflow machine. Among the above, the air reflow machine is preferable in terms of facility cost, and the vacuum reflow machine is preferable in terms of reducing voids in the solder after the reflow process.

In the reflow process, the electronic component is placed on the solder composition and heated by the reflow furnace under a predetermined condition. Through the reflow process, a sufficient solder joint can be formed between the electronic component and the printed wiring board. As a result, it is possible to attach the electronic component on the printed wiring board.

The condition for the reflow process may be appropriately set in accordance with the melting point of the solder. For instance, when the Sn—Ag—Cu solder alloy is used, a pre-heating process should be conducted at a temperature ranging from 150 to 200 degrees C. for 60 to 120 seconds, and a peak temperature should be set in a range from 230 to 270 degrees C.

Second Exemplary Embodiment

Next, a second exemplary embodiment of the invention will be described below.

The second exemplary embodiment is the same as the first exemplary embodiment except that (A2) thermosetting resin is used as the (A) resin. Accordingly, the flux composition using the (A2) thermosetting resin will be described below and other details will be omitted.

The flux composition for use in the second exemplary embodiment contains the (A2) thermosetting resin and (B) the activator.

(A) Component

Known thermosetting resins can be used as the (A2) thermosetting resin used in the second exemplary embodiment. Examples of the thermosetting resin include an epoxy resin, acrylic resin, urethane resin, and polyimide resin. Among the above, the use of epoxy resin is preferable in view of its flux effects. The use of an acrylic resin is also preferable in view of low-temperature curing characteristics.

It should be noted that a component having "flux effects" herein means that the component is, as in typical rosin-based flux, capable of: forming a coating film covering a metal surface of an object to be soldered with the coating film to isolate the metal surface from the atmosphere; reducing metal oxide on the metal surface during the soldering process, where the coating film is pushed away by a molten solder to allow the molten solder to be in contact with the metal surface; and forming a residue capable of serving as an insulator between circuits.

Known epoxy resins can be used as the epoxy resin used herein. Examples of the epoxy resin include bisphenol A epoxy resin, bisphenol F epoxy resin, biphenyl epoxy resin, naphthalene epoxy resin, cresol novolac epoxy resin, phenol novolac epoxy resin, and dicyclopentadiene epoxy resin. One type of the epoxy resins as described above may be used alone or two or more types thereof may be used in combination. The epoxy resin to be used preferably includes an epoxy resin that is liquid at a room temperature (25 degrees C.). When an epoxy resin that is solid at the room temperature is to be used, an epoxy resin that is liquid at the room temperature is preferably used in combination with the epoxy resin that is solid at the room temperature. Among the above types of the epoxy resins, in terms of adjustability of dispersibility of metal particles and paste viscosity, improvement in resistance of a hardened article against drop impact, and excellent spreadability of the solder, liquid bisphenol A epoxy resin, liquid bisphenol F epoxy resin, liquid hydrogenated bisphenol A epoxy resin, naphthalene epoxy resin, dicyclopentadiene epoxy resin, and biphenyl epoxy resin are preferable, and the liquid bisphenol A epoxy resin, liquid bisphenol F epoxy resin, and biphenyl epoxy resin are more preferable.

Examples of the acrylic resin include radical polymerizable resins having two or more (meth)acryloyl groups, and polymerizable resins containing a reactive dilution agent having one unsaturated double bond in a single molecule.

Examples of the radical polymerizable resins include urethane acrylate resin, epoxy acrylate resin and silicone acrylate resin. One type of the radical polymerizable resins as described above may be used alone or two or more types thereof may be used in combination.

Examples of the reactive dilution agent include 2-hydroxy-3-phenoxypropyl(meth)acrylate, tetrahydrofurfuryl (meth)acrylate, methyl(meth)acrylate, ethyl(meth)acrylate, n-butyl(meth)acrylate, isobutyl(meth)acrylate, tert-butyl (meth)acrylate, methoxy diethylene glycol(meth)acrylate, methoxy triethyleneglycol(meth)acrylate, 2-ethylhexyl (meth)acrylate, isodecyl(meth)acrylate, n-lauryl(meth)acrylate, tridecyl(meth)acrylate, n-stearyl(meth)acrylate, cyclohexyl(meth)acrylate, benzyl(meth)acrylate, phenoxyethyl (meth)acrylate, 2-hydroxyethyl(meth)acrylate, isobornyl (meth)acrylate, and (meth)acryloyl morpholine. One type of the reactive dilution agents as described above may be used alone or two or more types thereof may be used in combination.

A content of the (A2) thermosetting resin is preferably in a range from 50 mass % to 95 mass % with respect to 100 mass % of the flux composition, more preferably in a range from 80 mass % to 90 mass %. The (A2) component of the content at or above the lower limit can provide a strength sufficient to fix the electronic components, improve the resistance against drop impact, and reduce generation of cracks of the residue after the reflow process. The (A2) component of the content at or below the upper limit can provide sufficient amount of hardening component in the flux composition to accelerate the speed for hardening the thermosetting resin.

(B) Component

The (B) activator for use in the second exemplary embodiment is the same as the (B1) organic acid and the (B2) pyridine compound represented by the formula (1) described in the first exemplary embodiment. It should be noted that the (B) component in the second exemplary embodiment also serves as a hardening agent for the (A2) component.

(D) Component

The flux composition of the second exemplary embodiment may further contain the (D) thixotropic agent in terms of printability and the like. The (D) thixotropic agent used in the second exemplary embodiment is the same as the (D) thixotropic agent in the first exemplary embodiment.

Other Components

The flux composition used in the second exemplary embodiment may contain solvent, other additive(s) and/or other resin(s) in addition to the above (A), (B), and (D) components, as necessary. Examples of the other additive(s) include an antifoaming agent, an antioxidant, a modifier, a delustering agent, a foaming agent, and a hardening accelerator.

Modification(s)

The flux composition, the solder composition and the electronic board of the invention are not limited to the above-described exemplary embodiments, but the invention includes modifications and improvements as long as the modifications and improvements are compatible with an object of the invention.

For instance, though the printed wiring board and the electronic components of the electronic board are bonded through the reflow process, the bonding process is not limited thereto. In some embodiments, instead of the reflow process, for instance, laser beam is used to heat the solder composition (laser heating process) in order to bond the printed wiring board and the electronic components. In this case, a laser beam source is not particularly limited, but any laser beam source is usable in accordance with a wavelength corresponding to an absorption band of the metal. Examples of the laser source include a solid laser (e.g. ruby, glass, YAG), semiconductor laser (e.g. GaAs, InGaAsP), liquid laser (e.g. pigment), and gas laser (e.g. He—Ne, Ar, $CO_2$, excimer).

EXAMPLES

Next, the invention will be further described in detail based on Examples and Comparatives. However, it should be understood that the scope of the invention is by no means limited by the Examples and Comparatives.

Materials used in the Examples and Comparatives are as Follows.

(A1) Component
rosin-based resin: modified hydrogenated rosin, trade name "PINECRYSTAL KE-604", manufactured by ARAKAWA CHEMICAL INDUSTRIES, LTD.
(B1) Component
Organic acid A: succinic acid
Organic acid B: propane tricarboxylic acid
Organic acid C: dimer acid, trade name "UNIDYME14", manufactured by Arizona Chemical Ltd.
(B2) Component
pyridine compound: 4-hydroxypyridine
(C) Component
Solvent: hexyl diglycol
(D) Component
Thixotropic agent: polyamide thixotropic agent, trade name "TALEN", manufactured by Kyoeisha Chemical Co., Ltd
(E) Component
Solder Powders: Particle diameter distribution ranging from 20 to 38 μm (average particle diameter being approximately 30 μm), solder melting point ranging from 217 to 220 degrees C., composition of solder being Sn/Ag3.0/Cu0.5
Other Components
Amine A: n-octyl amine
Amine B: 2-phenyl-4-methylimidazole, trade name "2P4MZ", manufactured by SHIKOKU CHEMICALS CORPORATION
Amine C: 2-hydroxypyridine
Halogen activator: trans-2,3-dibromo-2-butene-1,4-diol Example 1

A flux composition was prepared by mixing 55 parts by mass of rosin-based resin, 2.5 parts by mass of the organic acid A, 2.5 parts by mass of pyridine compound, 7 parts by mass of thixotropic agent, and 33 parts by mass of solvent. Further, 11 parts by mass of flux composition and 89 parts by mass of solder powders (100 parts by mass in total) were mixed to prepare a solder composition.

Examples 2 to 5 and Comparatives 1 to 4

A flux composition and a solder composition were prepared in the same manner as in Example 1 except that composition of the materials was changed as shown in Table 1.

Evaluation of Solder Composition

The solder compositions were evaluated as follows (in terms of halogen-free, capillary balls, solder spreadability (albata), preservation stability, and leak touch). The obtained results are shown in Table 1.

(1) Halogen-Free

Halogen concentration (unit: mass ppm) in each of the solder compositions was calculated based on the components of the solder composition and contents thereof. Then, the degree of halogen-free was evaluated and categorized as follows based on the value of the halogen concentration.
A: Halogen concentration being 1500 mass ppm or less.
C: Halogen concentration being more than 1500 mass ppm.

(2) Capillary Balls

A test board was prepared as follows. On an evaluation board ("SP-TDC" manufactured by Tamura Corporation) on which chip components (1608 chips) can be mounted, the solder composition was printed using a metal mask of 120 μm thick. Further, 60 chip components were mounted on the evaluation board and the solder composition was melted in a reflow furnace (manufactured by Tamura Corporation) for soldering. The reflow process was conducted under the conditions of: preheat temperature ranging from 150 to 180 degrees C. (for 60 seconds), a period with a temperature at 220 degrees C. or more being 50 seconds, and a peak temperature being 245 degrees C. The obtained test board was observed through a magnifier to count the solder balls (per a chip: capillary balls) generated on sides of each of the chip components.

Then, the capillary balls were evaluated and categorized as follows based on the number of the solder balls (number per a chip).

A: The number of solder balls per a chip being 1 or less.
B: The number of solder balls per a chip being 1 or more and less than 5.
C: The number of solder balls per a chip being 5 or more.

(3) Solder Spreadability (Albata) 0.30 g±0.03 g of the solder composition was placed on an albata board (30 mm×30 mm×0.3 mm (thick)) and was heated on a hot plate at 240 degrees C. for 30 seconds. The height of the spread solder was measured using a micrometer and a spread rate (Sr) was calculated according to a formula (F1) below. An average of these operations repeated five times was calculated to obtain the spread rate of the test piece.

$$Sr=(D-H)/D\times 100 \quad (F1)$$

$$D=1.24V^{1/3} \quad (F2)$$

Sr: Spread rate (%)
H: Height of spread solder (mm)
D: Diameter (mm) of the solder, which was deemed to be a sphere
V: Mass/density of solder used in the test Then, the solder spreadability was evaluated and categorized as follows based on the results of the spread rate (Sr).
A: Spread rate of 70% or more.
C: Spread rate of less than 70%.

(4) Preservation Stability
Initially, viscosity of each of the solder compositions (samples) was measured. The samples were then put into hermetic containers, which were immersed in a constant-temperature bath whose temperature was set at 30 degrees C. to be preserved for 14 days. Subsequently, the viscosity of each of the preserved samples was measured. A difference (η2−η1) between a pre-preservation viscosity value (η1) and the viscosity value (η2) after being preserved for 14 days at 30 degrees C. was calculated. It should be noted that the viscosity was measured through a spiral method (measurement temperature: 25 degrees C., rotation speed: 10 rpm).

Then, the preservation stability was evaluated and categorized as follows based on the results of the difference in viscosity values.

A: The difference in the viscosity values being more than −50 Pa·s and less than 50 Pa·s.

B: The difference in the viscosity values being more than −100 Pa·s and −50 Pa·s or less, or 50 Pa·s or more and less than 100 Pa·s.

C: The difference in viscosity values being −100 Pa·s or less or 100 Pa·s or more.

TABLE 1

| | | | | Ex. 1 | Ex. 2 | Ex. 3 | Ex. 4 | Ex. 5 | Comp. 1 | Comp. 2 | Comp. 3 | Comp. 4 |
|---|---|---|---|---|---|---|---|---|---|---|---|---|
| Components of Flux Composition (parts by mass) | (A) | (A1) | Rosin-Based Resin | 55.0 | 51.0 | 55.0 | 55.0 | 55.0 | 55.0 | 55.0 | 55.0 | 53.0 |
| | (B) | (B1) | Organic Acid A | 2.5 | — | — | 1.5 | 3.5 | 2.5 | 2.5 | 2.5 | — |
| | | | Organic Acid B | — | 2.5 | — | — | — | — | — | — | — |
| | | | Organic Acid C | — | — | 5.0 | — | — | — | — | — | — |
| | | (B2) | Pyridine Compound | 2.5 | 2.5 | 2.5 | 3.5 | 1.5 | — | — | — | — |
| | | Other Components | Amine A | — | — | — | — | — | 2.5 | — | — | — |
| | | | Amine B | — | — | — | — | — | — | 2.5 | — | — |
| | | | Amine C | — | — | — | — | — | — | — | 2.5 | — |
| | | | Halogen Activator | — | — | — | — | — | — | — | — | 5.0 |
| | (C) | | Solvent | 33.0 | 36.5 | 30.5 | 33.0 | 33.0 | 33.0 | 33.0 | 33.0 | 34.0 |
| | (D) | | Thixotropic Agent | 7.0 | 7.5 | 7.0 | 7.0 | 7.0 | 7.0 | 7.0 | 7.0 | 8.0 |
| | | | Flux Composition in Total | 100.0 | 100.0 | 100.0 | 100.0 | 100.0 | 100.0 | 100.0 | 100.0 | 100.0 |
| Components of Solder Composition (mass %) | | | Flux Composition | 11 | 11 | 11 | 11 | 11 | 11 | 11 | 11 | 11 |
| | | (E) | Solder Powders | 89 | 89 | 89 | 89 | 89 | 89 | 89 | 89 | 89 |
| | | | Solder Composition in Total | 100 | 100 | 100 | 100 | 100 | 100 | 100 | 100 | 100 |
| Evaluation Results | | (1) | Halogen-Free | A | A | A | A | A | A | A | A | C |
| | | (2) | Capillary Balls | A | A | B | A | B | B | B | C | B |
| | | (3) | Solder Spreadability | A | A | A | A | A | A | A | A | A |
| | | (4) | Preservation Stability | A | A | A | A | A | C | C | C | B |

As is clearly shown in the results in Table 1, the solder compositions of the invention (Examples 1 to 5) exhibit excellent results in terms of all of halogen-free, capillary balls, solder spreadability (albata) and preservation stability, showing sufficient solder-melting property and preservation stability. In contrast, it is found that the preservation stability of each of the solder compositions of Comparatives 1 to 3 is insufficient. From the above, it is surprisingly found that the use of the specific pyridine compound (e.g. 4-hydroxypyridine), which is selected from among a large number of amines, in combination with the organic acid unexpectedly does not result in deterioration in preservation stability. It should be noted that 2-hydroxypyridine used in Comparative 3 is a compound having a pyridine ring and a hydroxyl group just like 4-hydroxypyridine used in Examples 1 to 5. Nevertheless, it is found that the results of capillary balls of the solder composition of Comparative 3 are insufficient.

Further, the results of halogen-free of the solder composition of Comparative 4 are insufficient. From the above, it is found that the solder composition of the invention can provide sufficient solder-melting property and preservation stability even when the solder composition is halogen-free.

What is claimed is:
1. A solder composition comprising:
solder powders; and
a flux composition, wherein
the flux composition comprises (A) a resin and (B) an activator,
the (B) component comprises (B1) an organic acid and (B2) a pyridine compound represented by a formula (1) below, (B2) the pyridine compound being symmetry in the structure,
the (B2) component is at least one selected from the group consisting of 4-hydroxypyridine, 2,6-dihydroxypyridine, 3,5-dihydroxypyridine, 2,4,6-trihydroxypyridine, 3,4,5-trihydroxypyridine, 2,6-dimethyl-4-hydroxypyridine, 3,5-dimethyl-4-hydroxypyridine, 2,6-diethyl-4-hydroxypyridine, 3,5-diethyl-4-hydroxypyridine, 2,6-dipropyl-4-hydroxypyridine and 3,5-dipropyl-4-hydroxypyridine, and
a chlorine concentration is 900 mass ppm or less, a bromine concentration is 900 mass ppm or less, an iodine concentration is 900 mass ppm or less, and a total halogen concentration is 1500 mass ppm or less in the solder composition,

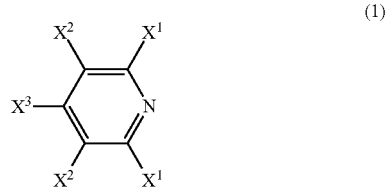

(1)

where, in the formula (1), $X^1$, $X^2$ and $X^3$ are the same or different, each of $X^1$, $X^2$ and $X^3$ representing a hydrogen atom, a hydroxyl group, a methyl group, an ethyl group or a propyl group, and all of $X^1$, $X^2$ and $X^3$ are not simultaneously hydrogen atoms.

2. The solder composition according to claim 1, wherein a mass ratio (B1/B2) of a content of the (B1) component to a content of the (B2) component ranges from 1/9 to 9/1.

3. The solder composition according to claim 1, wherein a mass ratio (B1/B2) of a content of the (B1) component to a content of the (B2) component ranges from 6/4 to 4/6.

4. The solder composition according to claim 1, wherein the (B1) component is at least one organic acid selected from the group consisting of dicarboxylic acids having 3 to 22 carbon atoms and tricarboxylic acids having 3 to 22 carbon atoms.

5. The solder composition according to claim 1, wherein the (B1) component is at least one organic acid selected from the group consisting of dicarboxylic acids having 4 to 7 carbon atoms and tricarboxylic acids having 6 to 9 carbon atoms.

6. The solder composition according to claim 1, wherein the (B1) component is at least one organic acid selected from the group consisting of succinic acid, glutaric acid, adipic acid, pimelic acid, propane tricarboxylic acid, hexane tricarboxylic acid, cyclohexane tricarboxylic acid, and benzene tricarboxylic acid.

7. The solder composition according to claim 1, wherein the (B1) component is at least one organic acid selected from the group consisting of succinic acid, propane tricarboxylic acid, and dimer acid.

8. The solder composition according to claim 1, wherein the (B1) component is at least one organic acid selected from the group consisting of succinic acid, and propane tricarboxylic acid.

9. The solder composition according to claim 1, wherein the (B2) component is at least one selected from the group consisting of 4-hydroxypyridine and 2,6-dimethyl-4-hydroxypyridine.

10. The solder composition according to claim 1, wherein the (B2) component is 4-hydroxypyridine.

11. The solder composition according to claim 1, wherein a content of the (B1) component is in a range from 0.1 mass % to 25 mass % with respect to 100 mass % of the flux composition, and
a content of the (B2) component is in a range from 0.1 mass % to 10 mass % with respect to 100 mass % of the flux composition.

12. The solder composition according to claim 1, wherein the (A) component is (A1) a rosin-based resin, and
the flux composition further comprises (C) a solvent and (D) a thixotropic agent.

13. The solder composition according to claim 12, wherein
the (C) component is at least one solvent selected from the group consisting of diethylene glycol, dipropylene glycol, triethylene glycol, hexylene glycol, hexyl diglycol, 1,5-pentanediol, methyl carbitol, butyl carbitol, 2-ethylhexyl diglycol, octanediol, phenyl glycol, diethylene glycol monohexylether, tetraethylene glycol dimethylether, and dibutyl maleic acid.

14. The solder composition according to claim 12, wherein
the (D) component is at least one thixotropic agent selected from the group consisting of hardened castor oil, polyamines, polyamides, bisamides, dibenzylidene sorbitol, kaolin, colloidal silica, organic bentonite and glass frit.

15. The solder composition according to claim 12, wherein
the (C) component comprises hexyl diglycol, and
the (D) component comprises polyamides.

16. The solder composition according to claim 1, wherein
the (A) component is (A2) a thermosetting resin, and
the flux composition further comprises (D) a thixotropic agent.

17. The solder composition according to claim 1, wherein the solder powders are made of a Sn—Ag—Cu solder alloy.

18. The solder composition according to claim 1, wherein no halogen is present in the flux composition except for inevitable impurities.

19. The solder composition according to claim 1, wherein
a chlorine concentration is 300 mass ppm or less, a bromine concentration is 300 mass ppm or less, an iodine concentration is 300 mass ppm or less, and a total halogen concentration is 500 mass ppm or less in the solder composition.

20. An electronic board comprising a soldered portion using the solder composition according to claim 1.

21. The solder composition according to claim 1, wherein the (B2) component is 2,6-dimethyl-4-hydroxypyridine.

22. The solder composition according to claim 1, wherein the (B2) component is at least one selected from the group consisting of 2,6-dihydroxypyridine, 3,5-dihydroxypyridine, 2,4,6-trihydroxypyridine, 3,4,5-trihydroxypyridine, 2,6-dimethyl-4-hydroxypyridine, 3,5-dimethyl-4-hydroxypyridine, 2,6-diethyl-4- hydroxypyridine, 3,5-diethyl-4-hydroxypyridine, 2,6-dipropyl-4-hydroxypyridine and 3,5-dipropyl-4-hydroxypyridine.

\* \* \* \* \*